(12) United States Patent
Yoshizawa et al.

(10) Patent No.: US 6,854,262 B2
(45) Date of Patent: Feb. 15, 2005

(54) AIR-FUEL RATIO CONTROL APPARATUS OF INTERNAL COMBUSTION ENGINE AND METHOD THEREOF

(75) Inventors: Hidekazu Yoshizawa, Atsugi (JP); Hajime Hosoya, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/472,392

(22) Filed: Sep. 22, 2003

(65) Prior Publication Data

US 2004/0139736 A1 Jul. 22, 2004

Related U.S. Application Data

(63) Continuation of application No. PCT/JP02/02617, filed on Mar. 19, 2002.

(30) Foreign Application Priority Data

Mar. 19, 2001 (JP) .......... 2001-078198
Jun. 5, 2001 (JP) .......... 2001-170120

(51) Int. Cl.$^7$ .......... F01N 3/00
(52) U.S. Cl. .......... 60/276; 60/274; 60/285; 123/696; 701/103; 701/109; 703/8
(58) Field of Search .......... 60/274, 276, 285; 123/696; 701/103, 109, 115; 703/8

(56) References Cited

U.S. PATENT DOCUMENTS

| | | | |
|---|---|---|---|
| 5,207,056 A | 5/1993 | Benninger | |
| 5,293,740 A | 3/1994 | Heppner et al. | |
| 5,678,402 A | 10/1997 | Kitagawa et al. | |
| 5,784,879 A | 7/1998 | Dohta et al. | |
| 5,842,340 A | * 12/1998 | Bush et al. | .......... 60/274 |
| 5,901,552 A | 5/1999 | Schnaibel et al. | |
| 6,289,673 B1 | 9/2001 | Tayama et al. | |
| 6,481,201 B2 | * 11/2002 | Kako et al. | .......... 60/285 |
| 6,502,389 B2 | * 1/2003 | Katayama et al. | .......... 60/285 |
| 6,637,194 B2 | * 10/2003 | Kakuyama et al. | .......... 60/285 |
| 6,769,243 B2 | * 8/2004 | Lewis et al. | .......... 60/277 |

FOREIGN PATENT DOCUMENTS

| | | | |
|---|---|---|---|
| JP | 2000-282925 A | 10/2000 | |
| JP | 2000-303880 A | 10/2000 | |
| JP | 2000-320375 A | 11/2000 | |

* cited by examiner

Primary Examiner—Binh Q. Tran
(74) Attorney, Agent, or Firm—Foley & Lardner LLP

(57) ABSTRACT

The present invention has an object to provide an air-fuel ratio control apparatus of an internal combustion engine and a method thereof, for estimating with high accuracy an oxygen adsorption amount in an exhaust purification catalyst, and controlling the oxygen adsorption amount in the exhaust purification catalyst at an optimum amount, thereby enabling to maintain high exhaust purification efficiency. To this end, in the present invention, there is stored a catalyst model that receives an oxygen amount which is not used for the oxidization/reduction in an exhaust purification catalyst disposed on an exhaust passage of an engine, and outputs an oxygen concentration in an exhaust gas downstream of the exhaust purification catalyst, the oxygen amount which is not used for the oxidization/reduction in the exhaust purification catalyst is calculated based on the oxygen concentration in the exhaust gas upstream of the exhaust purification catalyst and an engine intake air amount, parameters of the catalyst model are sequentially estimated based on the calculated oxygen amount and the oxygen concentration in the exhaust gas downstream of the exhaust purification catalyst, an oxygen adsorption amount in the exhaust purification catalyst is calculated using the estimated parameters of the catalyst model, thereby feedback controlling an air-fuel ratio upstream of the exhaust purification catalyst so that the calculated oxygen adsorption amount reaches an optimum oxygen adsorption amount.

17 Claims, 2 Drawing Sheets

AIR-FUEL RATIO CONTROL APPARATUS OF INTERNAL COMBUSTION ENGINE AND METHOD THEREOF

This application is a continuing application, filed under 35 U.S.C. § 111(a), of International application PCT/JP02/02617, filed Mar. 19, 2002 which International Application, in turn, claims priority benefit based upon Japanese Patent Application Nos. 2001-78198 and 2001-170120, filed Mar. 19, 2001 and Jun. 5, 2001 respectively, the contents of which are incorporated by reference.

1. Field of the Invention

The present invention relates to an air-fuel ratio control apparatus of an internal combustion engine and a method thereof, and in particular to a technique for controlling an oxygen adsorption amount in an exhaust purification catalyst at an optimum amount, thereby maintaining high exhaust purification efficiency.

2. Related Art of the Invention

Heretofore, there has been known an exhaust purification system for an internal combustion engine, in which an exhaust purification catalyst (to be simply referred to as a catalyst) is disposed on an exhaust passage of the internal combustion engine, and also an air-fuel ratio feedback control is performed so that an air-fuel ratio of an air-fuel mixture to be burnt is kept at a stoichiometric air-fuel ratio, in order to realize a high conversion ratio while balancing the oxidation and reduction in the catalyst.

In such a type of exhaust purification system, an oxygen adsorption amount in the catalyst greatly affects the conversion ratio. That is, if the oxygen adsorption amount in the catalyst becomes larger than an optimum amount, although the oxidation reactions of CO and HC are quickened, the reduction reaction of NOx is slowed. On the other hand, if the oxygen adsorption amount in the catalyst becomes less than the optimum amount, although the reduction reaction of NOx is quickened, the oxidation reactions of CO and HC are slowed.

In view of the above problem, there has been proposed a system in which an oxygen adsorption amount in a catalyst is estimated, and an exhaust air-fuel ratio is controlled based on the estimated oxygen adsorption amount. For example, a control device of an oxygen storage amount of a three-way catalyst proposed previously by the applicant of the present invention, comprises: a wide range type oxygen concentration sensor (A/F sensor) disposed on an upstream side of the three-way catalyst, for detecting linearly an exhaust air-fuel ratio; and a stoichiometric type oxygen concentration sensor ($O_2$ sensor) disposed on a downstream side of the three-way catalyst, for detecting the rich/lean of the exhaust air-fuel ratio to a stoichiometric air-fuel ratio. In this device, an oxygen adsorption amount of the catalyst is estimated based on the upstream side exhaust air-fuel ratio obtained based an output value of the upstream side A/F sensor using a first conversion table, and the downstream side exhaust air-fuel ratio obtained based an output value of the downstream side $O_2$ sensor using a second conversion table in which the vicinity of stoichiometric air-fuel ratio is allotted in the high density, and the exhaust air-fuel ratio upstream (inlet) of the three-way catalyst is controlled, thereby adjusting the oxygen adsorption amount in the catalyst at an optimum amount (refer to Japanese Unexamined Patent Publication No. 2000-82925).

However, in the above device, it is necessary to provide a conversion table to each of the A/F sensor on the upstream side of the catalyst and the $O_2$ sensor on the downstream side of the catalyst, thereby requiring the large memory capacity.

Further, in order to estimate the oxygen adsorption amount in the catalyst with high accuracy, since it is necessary to set in detail the conversion table provided, to each sensor according to operating conditions and the like, there is a problem in that the memory capacity is further increased.

Moreover, the above device does not cope with a characteristic (oxygen adsorption characteristic) variation due to the degradation of catalyst itself and the like. Therefore, if the characteristic of the catalyst is varied, there is a possibility that the oxygen adsorption amount in the catalyst cannot be estimated with high accuracy.

The present invention has been accomplished in view of the above problems and has an object to provide an air-fuel ratio control apparatus of an internal combustion engine and a method thereof, for estimating with high accuracy an oxygen adsorption amount in an exhaust purification catalyst without the necessity of the large memory capacity, and controlling an exhaust air-fuel ratio so that the oxygen adsorption amount in the exhaust purification catalyst reaches an optimum amount, thereby maintaining high exhaust purification efficiency.

SUMMARY OF THE INVENTION

In view of the above problems, the present invention is constructed so that there is stored a catalyst model that receives an oxygen amount which is not used for the oxidization/reduction in an exhaust purification catalyst disposed on an exhaust passage of an engine, and outputs an oxygen concentration in an exhaust gas downstream of the exhaust purification catalyst, the oxygen amount which is not used for the oxidization/reduction in the exhaust purification catalyst is calculated based on a detected oxygen concentration in the exhaust gas upstream of the exhaust purification catalyst and an engine intake air amount, parameters of the catalyst model are sequentially estimated based on the oxygen amount and a detected oxygen concentration in the exhaust gas downstream of the exhaust purification catalyst, an oxygen adsorption amount in the exhaust purification catalyst is calculated using the estimated parameters of the catalyst model, thereby feedback controlling an air-fuel ratio upstream of the exhaust purification catalyst based on the calculated oxygen adsorption amount.

According to this construction, there is stored a catalyst model that receives an oxygen amount which is not used for the oxidization/reduction in an exhaust purification catalyst disposed on an exhaust passage of an engine, and outputs an oxygen concentration in an exhaust gas downstream of the exhaust purification catalyst, the oxygen amount which is introduced to the exhaust purification catalyst but is not used for the oxidization/reduction in the exhaust purification catalyst is calculated based on a deviation of a detected (actual) air-fuel ratio upstream of the exhaust purification catalyst from a stoichiometric air-fuel ratio and an engine intake air amount, parameters of the catalyst model are sequentially estimated based on the oxygen amount and a detected oxygen concentration in the exhaust gas downstream of the exhaust purification catalyst (that is, an oxygen amount discharged from the catalyst).

A change amount of an oxygen adsorption amount in the exhaust purification catalyst is calculated using the estimated parameters of the catalyst model, and further, the change amount is integrally operated to calculate the oxygen adsorption amount, thereby calculating the oxygen adsorption amount in the exhaust purification catalyst while accurately coping with a characteristic variation due to operating conditions, degradation of the catalyst itself or the like.

Then, the exhaust air-fuel ratio upstream of the exhaust purification catalyst is controlled so that the thus calculated oxygen adsorption amount in the exhaust purification catalyst reaches an optimum range (optimum oxygen adsorption amount) according to the engine operating conditions, thereby making it possible to maintain high exhaust purification efficiency.

The other objects and features of this invention will become understood from the following description with accompanying drawings.

DETAILED DESCRIPTION OF THE EMBODIMENTS

An embodiment of the present invention will be described based on the drawings.

Figure 1:
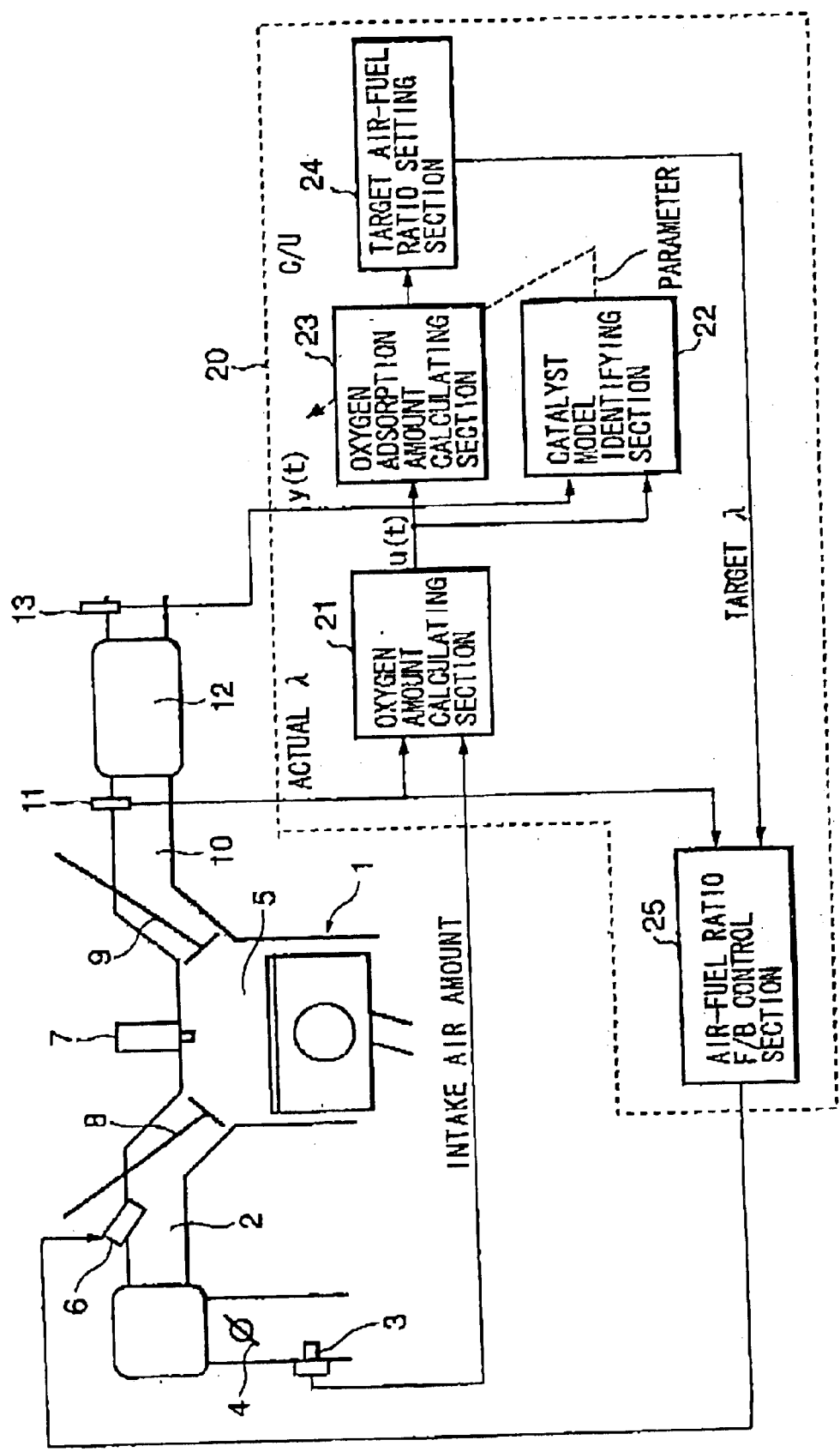
FIG. 1 is a diagram showing a system structure of an engine in an embodiment of the present invention.

FIG. 1 is a diagram of a system structure of an internal combustion engine showing an embodiment of the present invention. In FIG. 1, in an intake passage 2 of an engine 1, an air flow meter 3 detecting an intake air amount Qa is disposed, and intake air amount Qa is controlled by means of a throttle valve 4.

A fuel injection valve (injector) 6 injecting fuel and an ignition plug 7 performing spark ignition in a combustion chamber 5 are disposed in each cylinder of engine 1. An air-fuel mixture sucked into combustion chamber 5 via an intake valve 8 is compressed to be spark ignited by means of ignition plug 7.

An exhaust purification catalyst (to be simply referred to as catalyst) 12 is disposed on an exhaust passage 10 of engine 1. An exhaust gas discharged to exhaust passage 10 from combustion chamber 5 via an exhaust valve 9 is emitted to the atmosphere via catalyst 12.

Further, a wide range type oxygen concentration sensor (A/F sensor) 11 detecting linearly an air-fuel ratio according to an oxygen concentration in the exhaust gas is disposed on an upstream side of catalyst 12, and a so-called stoichiometric type oxygen concentration sensor ($O_2$ sensor) 13, an output value of which is abruptly changed in the vicinity of a stoichiometric air-fuel ratio of exhaust air-fuel ratio, is disposed on a downstream side of catalyst 12.

A control unit (C/U) 20 receives various signals from A/F sensor 11, $O_2$ sensor 13, a crank angle sensor (not shown in the figure), a water temperature sensor (not shown in the figure), air flow meter 3 and the like. Control unit (C/U) 20 sets a target exhaust air-fuel ratio to control a fuel injection quantity and the like so that the exhaust air-fuel ratio reaches the target exhaust air-fuel ratio by processing the received various signals in accordance with a control block diagram shown in FIG. 1. Accordingly, control unit (C/U) 20 constitutes a storage section, a calculating section and a feedback control section.

An air-fuel ratio control according to the present embodiment executed by control unit (C/U) 20 will be described in accordance with the block diagram (surrounded by broken line) shown in FIG. 1. In the following description, an air-fuel ratio control section inclusive of the storage section, calculating section and feedback control section is subdivided. That is, as shown in FIG. 1, the air-fuel ratio control section of control unit (C/U) 20 comprises an oxygen amount calculating section 21, a catalyst model identifying section 22, an oxygen adsorption amount calculating section 23, a target air-fuel ratio setting section 24 and an air-fuel ratio feedback (F/B) control section 25.

Oxygen amount calculating section 21 calculates an oxygen amount, which is sucked into catalyst 12 but is not used for the oxidization/reduction. This oxygen amount is an oxygen intake amount affecting the oxygen adsorption amount in catalyst 12. Specifically, as shown in the following formula (1), an oxygen intake amount u(t) affecting the oxygen adsorption amount in catalyst 12 is calculated by multiplying intake air amount Qa on a difference between the air-fuel ratio (actual λ) detected by A/F sensor 11 and the stoichiometric air-fuel ratio (λ=1).

$$u(t) = (\text{actual } \lambda) \times Qa \quad (1)$$

Catalyst model identifying section 22 stores a catalyst model (identification model) which is set to receive oxygen amount u(t) calculated by oxygen amount calculating section 21 and to output a detection value (that is, discharged oxygen amount) y(t) of the $O_2$ sensor on the downstream side of catalyst 12, and estimates parameters of the catalyst model using a recursive least squares method (RLS method), to identify the catalyst model.

Figure 2:
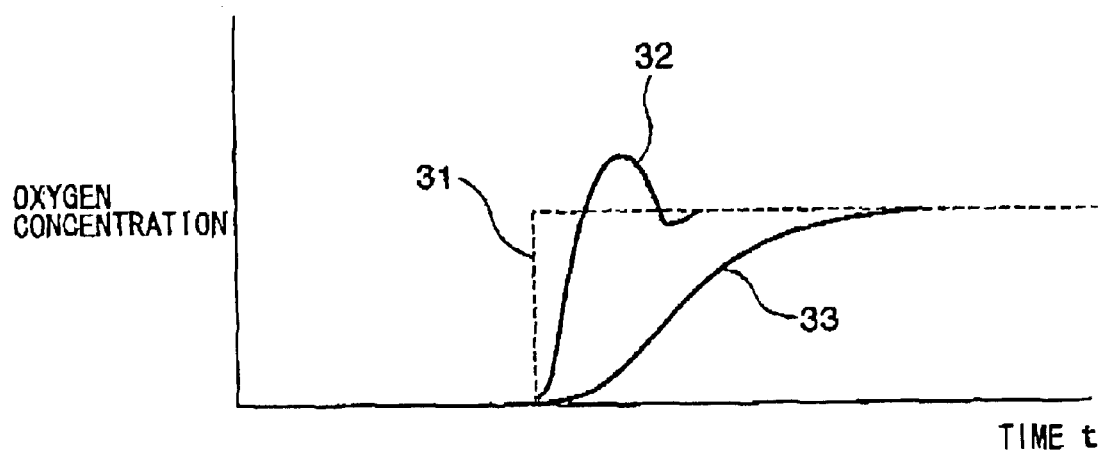
FIG. 2 is a graph showing a transitional characteristic of a catalyst according to the embodiment of the present invention.

Here, in the present embodiment, when setting the catalyst model to be stored, considering there are the cases where the detection value (discharged oxygen amount) of $O_2$ sensor on the downstream side indicates a relatively rapid response (waveform 32) and where the detection value (discharged oxygen amount) of $O_2$ sensor on the downstream side indicates a relatively delay response (waveform 33) as shown in FIG. 2, catalyst 12 is made to be a transfer function. That is, in the present embodiment, a first transfer function obtained by making catalyst 12 to be a transfer function considering only the rapid response (that is, a rapid time constant), and a second transfer function obtained by making catalyst 12 to be a transfer function considering only the delay response (that is, a delay time constant) are calculated, respectively, and a transfer function obtained by combining the first and second transfer functions is made to be a final transfer function of catalyst 12, to set catalyst 12 represented by the final transfer function as the catalyst model. This is because, it has been confirmed in the experiment by the present inventor that the actual oxygen adsorbing behavior of catalyst 12 can be represented with high accuracy using the combined transfer function.

The setting of catalyst model to be identified (parameters of which are to be estimated) by catalyst model identifying section 22 will be described in detail.

First, the description will be made on making catalyst 12 to be a transfer function. Note, in the present embodiment, Freundlich's adsorption formula is used as a formula for $O_2$ adsorption amount.

Provided that v is an $O_2$ adsorption amount of catalyst 12, and p is an $O_2$ intake amount of catalyst 12 (this is used as a substitution of $O_2$ partial pressure), $O_2$ adsorption amount v can be represented by the following formula (2).

$$v = ap^{1/n} \quad (2)$$

In the above formula, "a" is a constant obtained from the linearity between a logarithm of $O_2$ adsorption amount and a logarithm of $O_2$ intake amount ($O_2$ partial pressure) p, and "n" is a constant obtained from the linearity between the logarithm of $O_2$ adsorption amount and the logarithm of $O_2$ intake amount ($O_2$ partial pressure) p.

A transfer function G1 (first transfer function) of catalyst 12 in the case of considering only the rapid time constant is calculated.

If $\Delta v$ is an $O_2$ adsorption change amount from an equilibrium state where the $O_2$ adsorption amount and an $O_2$ discharge amount of catalyst 12 are equal to each other, and $\Delta p$ is an $O_2$ intake change amount (a change amount of $O_2$ partial pressure following the change in $O_2$ intake amount) from the equilibrium state where the $O_2$ adsorption amount and the $O_2$ discharge amount of catalyst 12 are equal to each other, an increased or decreased amount of $O_2$ adsorption amount is calculated as follows. That is, the following formula is derived from the formula (2).

$$v + \Delta v = a(p + \Delta p)^{1/n} = ap^{1/n}(1 + \Delta p/p)^{1/n}$$

This formula is expanded to obtain the following formula (3).

$$v + \Delta v = ap^{\frac{1}{n}} \cdot \left[ 1 + \frac{1}{n} \cdot \left(\frac{\Delta p}{p}\right) + \frac{1-n}{2n}\left(\frac{\Delta p}{p}\right)^2 + \cdots \right] \quad (3)$$

Accordingly, if an approximation is made considering up to a quadratic term based on the formulas (2) and (3), the $O_2$ adsorption change amount $\Delta v$ is represented by the following formula (4) ($|\Delta p/p| < 1$).

$$\Delta v \cong ap^{\frac{1}{n}} \cdot \left[ \frac{1}{n} \cdot \left(\frac{\Delta p}{p}\right) + \frac{1-n}{2n}\left(\frac{\Delta p}{p}\right)^2 \right] \quad (4)$$

Here, if $\Delta q$ is an $O_2$ discharge change amount from the equilibrium state where the $O_2$ adsorption amount and the $O_2$ discharge amount of catalyst 12 are equal to each other, in the case of the rapid time constant, the $O_2$ adsorption change amount $\Delta v$ can be replaced by a difference between the $O_2$ intake change amount $\Delta p$ and the $O_2$ discharge change amount $\Delta q$ (that is, $\Delta v = \Delta p - \Delta q$). Therefore, from the formula (4), the following formula is derived.

$$ap^{\frac{1}{n}} \cdot \left[ \frac{1}{n} \cdot \left(\frac{\Delta p}{p}\right) + \frac{1-n}{2n}\left(\frac{\Delta p}{p}\right)^2 \right] = \Delta p - \Delta q \quad (5)$$

If Laplace transform is performed on the formula (5), the following formulas can be obtained.

$$\frac{ap^{\frac{1}{n}}}{np} \cdot \frac{1}{s^2} \cdot \Delta P + \frac{ap^{\frac{1}{n}}(1-n)}{2np^2} \cdot \frac{2}{s^3} \cdot \Delta P = \frac{1}{s^3}(\Delta P - \Delta Q)$$

$$\frac{ap^{\frac{1}{n}}}{np} \cdot \Delta P + \frac{ap^{\frac{1}{n}}(1-n)}{np^2} \cdot \frac{1}{s} \cdot \Delta P = (\Delta P - \Delta Q)$$

Then, the above formulas can be processed as the following formula (6).

$$\Delta Q = \Delta P \left( 1 - \frac{ap^{\frac{1}{n}}}{np} - \frac{ap^{\frac{1}{n}}(1-n)}{np^2} \cdot \frac{1}{s} \right) \quad (6)$$

Consequently, $\Delta Q/\Delta P$ is represented by the following formula.

$$\frac{\Delta Q}{\Delta P} = \left( 1 - \frac{ap^{\frac{1}{n}}}{np} - \frac{ap^{\frac{1}{n}}(1-n)}{np^2} \cdot \frac{1}{s} \right) = 1 - k1 - \frac{k2}{s}$$

In the above formula, $k1 = ap^{1/n}/np$, and $k2 = ap^{1/n}(1-n)/np^2$.

Then, if the above formula is subjected to "z transform", the following formula (7) is obtained, and this formula is the first transfer function G1 in the case of considering only the rapid time constant.

$$\frac{\Delta Q}{\Delta P} = 1 - k1 - \frac{k2}{s} = 1 - k1 - \frac{k2}{1 - z^{-1}} \quad (7)$$

$$= \frac{1 - k1 - k2 + (k1 - 1)z^{-1}}{1 - z^{-1}} = \frac{(1 - k1 - k2)z + (k1 - 1)}{z - 1} (= G1)$$

Next, a transfer function (second transfer function) G2 of catalyst 12 in the case of considering only the delay time constant is calculated.

Note, in the case, of considering only the rapid time constant, up to the quadratic term of the $O_2$ adsorption change amount $\Delta v$ subjected to Taylor's expansion has been considered. However, in the case of considering only the delay time constant, an approximation is made considering only a linear term. Accordingly, the $O_2$ adsorption change amount $\Delta v$ is obtained by the following formula (8).

$$\Delta v = ap^{\frac{1}{n}} \left[ \frac{1}{n}\left(\frac{\Delta p}{p}\right) \right] \quad (8)$$

Here, in the case of the delay time constant, since an $O_2$ adsorption change amount per unit time $d(\Delta v)/dt$ can be considered to be a difference between the $O_2$ intake change amount $\Delta p$ and the $O_2$ discharge change amount $\Delta q$ (that is, $d(\Delta v)/dt = \Delta p - \Delta q$), the $O_2$ adsorption change amount per unit time $d(\Delta v)/dt$ can be represented by the following formula (9) from the formula (8).

$$\frac{d(\Delta v)}{dt} = \frac{d}{dt}\left( \frac{ap^{\frac{1}{n}}}{n}\left(\frac{\Delta p}{p}\right) \right) = \Delta p - \Delta q \quad (9)$$

If Laplace transform is performed on the formula (9), the following formula can be obtained.

$$\frac{ap^{\frac{1}{n}}}{np} \cdot \frac{1}{s^2} \cdot \Delta P \cdot s = \frac{1}{s^2}(\Delta P - \Delta Q)$$

Then, the above formulas can be processed as the following formula (10).

$$\Delta Q = \Delta P \left( 1 - \frac{ap^{\frac{1}{n}}}{np} \cdot s \right) \quad (10)$$

Consequently, the following formula is obtained.

$$\frac{\Delta Q}{\Delta P} = 1 - \frac{ap^{\frac{1}{n}}}{np} \cdot s = 1 - k3 \cdot s \cong 1 - \frac{k3 \cdot s}{1 + k3 \cdot s} = \frac{1}{1 + k3 \cdot s}$$

Then, if the above formula is subjected to "z transform", the following formula (11) is obtained, and this formula is the transfer function G2 in the case of considering only the delay time constant. In this formula, $k3 = ap^{1/n}/np$.

$$\frac{\Delta Q}{\Delta P} = \frac{\frac{1}{k3}}{1 - z^{-1} e^{\frac{-T}{k3}}} \quad (= G2) \tag{11}$$

Then, a (final) transfer function Gs of catalyst 12 is calculated as shown in the following formula (12) (a quadratic transfer function) by combining the first transfer function G1 in the case of considering only the rapid time constant (refer to the formula (7)) with the second transfer function G2 in the case of considering only the delay time constant (refer to the formula (11)).

$$Gs = G1 \cdot G2 = \frac{(1-k1-k2)z + (k1-1)}{z-1} \cdot \frac{\frac{1}{k3}}{1 - z^{-1} e^{\frac{-T}{k3}}} \tag{12}$$

$$= \frac{\frac{1}{k3}(1-k1-k2)z + \frac{1}{k3}(k1-1)}{z - \left(1 + e^{\frac{-T}{k3}}\right) + z^{-1} e^{\frac{-T}{k3}}}$$

Here, if $a1 = -(1+e^{-T/k3})$, $a2 = e^{-T/k3}$, $b1 = (1-k1-k2)/k3$ and $b2 = (k1-1)/k3$, $Gs = (b1 \cdot z + b2)/(z + a1 + a2 \cdot z^{-1})$. However, since the RLS method to be described later cannot be applied to this formula, then
$Gs = (b1 \cdot z + b2)/(z^2 + a1 \cdot z + a2)$, and this formula is made to be the (final) transfer function of catalyst 12.

Then, using an ARX model, the catalyst model is represented by the following formula (13), to be stored.

$$y(k) + a1y(k-1) + a2y(k-2) = b1u(k-1) + b2u(k-2) + e(t) \tag{13}$$

If a parameter vector θ and a data vector ψ are defined as in the formulas (14) and (15), respectively, y(k) can be represented by the formula (16).

$$\theta = [a1, a2, b1, b2]^T \tag{14}$$

$$\psi = [-y(k-1), -y(k-2), u(k-1), u(k-2)]^T \tag{15}$$

$$y(k) = \theta^T \psi(k) + e(k) \tag{16}$$

In the case of considering a waste time "t" included in a processing period of A/F sensor 11 and $O_2$ sensor 13, the formulas (13) to (16) can be represented as the following formulas (13') to (16').

$$y(k) + a1y(k-1) + a2y(k-2) = b1u(k-t) + b2u(k-t-1) + e(t) \tag{13'}$$

$$\theta = [a1, a2, b1, b2]^T \tag{14'}$$

$$\psi' = [-y(k-1), -y(k-2), u(k-t), u(k-t-1)]^T \tag{15'}$$

$$y(k) = \theta'^T \psi'(k) + e(k) \tag{16'}$$

Next, the description will be made on the identification (sequential estimation of parameters) of the catalyst model (the formula 13)) performed by catalyst model identifying section 22.

A characteristic of catalyst 12 is varied depending on operating conditions or a degradation degree of catalyst 12 itself. Therefore, it is possible to obtain the catalyst model optimum for representing a state thereof by sequentially estimating on-line parameters (a1, a2, b1, b2) of the catalyst model shown in the formula (13). In this parameter estimation, a least squares method is used to calculate parameters, in which a square of error between an actual value and an estimated value becomes minimum.

Note, such a calculating formula uses a method same as a typical weighted recursive least squares method, and specifically is constituted by parameter estimating formulas represented by the following time updating formulas (17) to (19).

$$\hat{\theta}(k) = \hat{\theta}(k-1) + \frac{P(k-1)\varphi(k)}{1 + \varphi^T(k)P(k-1)\varphi(k)} e(k) \tag{17}$$

$$e(k) = y(k) - \psi^T(k)\hat{\theta}(k-1) \tag{18}$$

$$P(k) = \frac{1}{\lambda}\left[P(k-1) - \frac{P(k-1)\varphi(k)\varphi^T(k)P(k-1)}{\lambda + \varphi^T(k)P(k-1)\varphi(k)}\right] \tag{19}$$

$$(k = 1, 2, 3, \ldots, n)$$

In the above formulas,
$\hat{\theta}(t)$: parameter estimation value (parameter vector),
e(k): estimation error (actual value—estimation (simulation) value),
P(k): m×m matrix consisting of inputs/outputs (covariance matrix),
ψ: input/output value (data spectrum), and
λ: oblivion coefficient.
Here, the derivation of the above parameter estimation formulas (17) and (19) will be described.
(A) Application of Least Squares Method
The following formula is set as the evaluation standard for estimating parameters.

$$J_N(\theta) = \frac{1}{N} \sum_{k=1}^{N} 1(k, \theta, e(k, \theta))$$

In the above formula, 1(k, θ, e(k, θ)) is an arbitrary positive scalar function for measuring an estimation error.
In the least squares method, parameters are estimated so that the evaluation standard $J_N(\theta)$ becomes minimum, provided that 1(k, θ, e(k, θ)) = $e_2$(k, θ).
Here, in the ARX model, since an estimation value for next output is linear relative to θ, that is, $\theta^T \psi(k)$, the estimation error e(k, θ) is given as follows.

$$e(k, \theta) = y(k) - \theta^T \psi(k) \tag{20}$$

Then, the evaluation standard $J_N(\theta)$ of when the least squares method is applied is resulted in the following formula (21).

$$J_N(\theta) = \frac{1}{N}\sum_{k=1}^{N} e^2(k, \theta) = \frac{1}{N}\sum_{k=2}^{N}(y(k) - \theta^T \varphi(k))^2 \tag{21}$$

$$= \frac{1}{N}\sum_{k=1}^{N}(y^2(k) - 2y(k)\theta^T(k) + \theta^T \varphi(k)\varphi^T \theta)$$

$$= C(N) - 2\theta^T f(N) + \theta^T R(N)\theta$$

In the above formula, $$R(N) = \frac{1}{N}\sum_{k=1}^{N}\varphi(k)\varphi^T(k): m \times m \text{ matrix,} \tag{22}$$

-continued $$f(N) = \frac{1}{N}\sum_{k=1}^{N} y(k)\varphi(k): \; m\text{-dimensional vector,} \quad (23)$$

$$C(N) = \frac{1}{N}\sum_{k=1}^{N} y^2(k): \; \text{scalar,} \quad (24)$$

and m is of θ-dimensions,

Here, in order to obtain a minimum value of $J_N(\theta)$, if the formula (21) is set to be 0 by performing differentiation on θ, the resultant is as follows.

$$J_N(\theta)^1 = -2f(N) + 2\hat{\theta}(N)R(N) = 0$$

Then, the following formulas can be obtained.

$$R(N)\hat{\theta}(N) = f(N) \quad (25)$$

$$\hat{\theta}(N) = R(N)^{-1} f(N) \quad (26)$$

(B) Derivation of the formula (19)

Next, the derivation of the formulas (17) and (19) is performed using the above formulas (22) to (26).

First, the formula (26) is resulted in the following formula (27) based on the formulas (22) and (23).

$$\hat{\theta}(N) = \left(\frac{1}{N}\sum_{k=1}^{N} \varphi(k)\varphi^T(k)\right)^{-1} \left(\frac{1}{N}\sum_{k=1}^{N} y(k)\varphi(k)\right) \quad (27)$$

A first term of right side in the formula (27) is defined as follows.

$$P(N) = \left(\sum_{k=1}^{N} \varphi(k)\varphi^T(k)\right)^{-1} \quad (28)$$

Then, if the right and left sides of the above formula (28) are made to be an inverse matrix to decompose one element of sum of products, the following formula (29) is derived.

$$P^{-1}(N) = \sum_{k=1}^{N} \varphi(k)\varphi^T + \varphi(N)\varphi^T(N) \quad (29)$$

$$P^{-1}(N) = P^{-1}(N-1) + \varphi(N)\varphi^T(N)$$

Then, if the formula (29) is made to be the inverse matrix, the following formula (30) is derived.

$$P(N) = [P^{-1}(N-1) + \psi(N)\psi^T(N)]^{-1} \quad (30)$$

If inverse matrix lemma is applied to the above formula (30), the following formula (31) is derived.

$$P(N) = P(N-1) - \quad (31)$$
$$P(N-1)\varphi(N)\left(1 + \varphi^T(N)P(N-1)\varphi(N)\right)^{-1}\varphi^T(N)P(N-1)$$
$$= P(N-1) - \frac{P(N-1)\varphi(N)\varphi^T(N)P(N-1)}{1 + \varphi^T(N)P(N-1)\varphi(N)}$$

Note, the inverse matrix lemma means that the following formula is established relative to a certain regular matrix A.

$$(A+BC)^{-1} = A^{-1} - A^{-1}B(I+CA^{-1}B)^{-1}CA^{-1}$$

(C) Derivation of the Formula (17)

The formula (23) is the m-dimensional vector, and therefore, is replaced as follows.

$$\frac{1}{N}\sum_{k=1}^{N} y(k)\varphi(k) = \frac{1}{N}\sum_{k=1}^{N} \varphi(k)y(k)$$

Here, from the formulas (27) and (28), the following formula is derived.

$$\hat{\theta}(N) = P(N)\left(\sum_{k=1}^{N} \varphi(k)y(k)\right)$$

Since a second term of right side can be decomposed to;

$$\sum_{k=1}^{N} \varphi(k)y(k) = \sum_{k=1}^{N-1} \varphi(k)y(k) + \varphi(N)y(N),$$

if this is substituted for the above formula the following formula (32) is derived.

$$\hat{\theta}(N) = P(N)\left(\sum_{k=1}^{N-1} \varphi(k)y(k) + \varphi(N)y(N)\right) \quad (32)$$

Here, since the formula (27) can be transformed to;

$$\left(\sum_{k=1}^{N} \varphi(k)y(k)\right) = P^{-1}(N)\hat{\theta}(N),$$

if this is substituted for the formula (32), the following formula (33) is derived.

$$\hat{\theta}(N) = P(N)(P^{-1}(N)\hat{\theta}(N-1) + \psi(N)y(N)) \quad (33)$$

Here, if the formula (29) is substituted for the formula (33), the following formula is derived.

$$\hat{\theta}(N) = P(N)[(P^{-1}(N) - \psi(N)\psi^T(N))\hat{\theta}(N-1) + \psi(N)y(N)]$$

If this is expanded, the following formula (34) is derived.

$$\hat{\theta}(N) = P(N)P^{-1}(N)\hat{\theta}(N-1) - \quad (34)$$
$$P(N)\varphi(N)\varphi^T(N)\hat{\theta}(N-1) + P(N)\varphi(N)y(N)$$
$$= \hat{\theta}(N-1) + P(N)\varphi(N)\left[y(N) - \varphi^T(N)\hat{\theta}(N-1)\right]$$

Then, if ψ(N) is multiplied on the formula (31), the following formula (35) is derived.

$$P(N)\varphi(N) = P(N-1)\varphi(N) - \frac{P(N-1)\varphi(N)\varphi^T(N)P(N-1)\varphi(N)}{1 + \varphi^T(N)P(N-1)\varphi(N)} \quad (35)$$
$$= P(N-1)\varphi(N)\left[1 - \frac{\varphi^T(N)P(N-1)\varphi(N)}{1 + \varphi^T(N)P(N-1)\varphi(N)}\right]$$
$$= P(N-1)\varphi(N)$$
$$\left[\frac{1 + \varphi^T(N)P(N-1)\varphi(N) - \varphi^T(N)P(N-1)\varphi(N)}{1 + \varphi^T(N)P(N-1)\varphi(N)}\right]$$

-continued $$= \frac{P(N-1)\varphi(N)}{1+\varphi^T(N)P(N-1)\varphi(N)}$$

If the formula (35) is substituted for the formula (34), the following formula (36) is derived.

$$\hat{\theta}(N) = \hat{\theta}(N-1) + \frac{P(N-1)\Psi(N)}{1+\Psi^T(N)P(N-1)\Psi(N)}[y(N) - \Psi^T(N)\hat{\theta}(N-1)] \quad (36)$$

Since the value in the square bracket of the right side corresponds to the estimation error, the following formula is derived.

$$e(N) = y(N) - \psi^T(N)\hat{\theta}(N-1) \quad (37)$$

Accordingly, the formula (36) results in the following formula (38).

$$\hat{\theta}(N) = \hat{\theta}(N-1) + \frac{P(N-1)\Psi(N)}{1+\Psi^T(N)P(N-1)\Psi(N)} e(N) \quad (38)$$

The formulas (31), (37) and (38) are parameter estimation formulas consisting of a normal (without weighted) recursive least squares method. However, in the parameter estimation in a time-change system, a sufficiently converged estimation value can be obtained if past values are made oblivious exponentially, and therefore, the evaluation standard $J_N(\theta)$ is set as follows.

$$J_N(\theta) = \sum_{k=1}^{N} \lambda^{N-k} e^2(k)$$

In the above formula, $\lambda$ is the oblivion coefficient which is a positive number equal to or less than 1 (for example, 0.98). Then, the parameter estimation formulas (31), (37) and (38) are transformed to weighted ones so that parameter estimation formulas (17) to (19) are obtained.

If the system identification is started using a parameter initial value of 0 as in the general system identification, a certain period of time is required until the convergence and during such a period of time, the parameter estimation cannot be performed. Therefore, in the present embodiment, a value previously obtained off-line in the experiment or the like (to be referred to as an off-line calculated parameter value hereunder) is used as an initial value. That is, when the calculation is started, the off-line calculated parameter value is set (as the initial value) to the parameter value (parameter vector) and the parameter estimation value (parameter, prediction value) of the formulas (17) to (19).

Note, the off-line calculated parameter value is calculated by sampling data of the oxygen intake amount (input u(t)) and the $O_2$ sensor detection value (output y(t)) at an idling operation when using, for example, a catalyst, a characteristic of which becomes near a central value, and using a general prediction error method (for example, a maximum likelihood estimation method or a least square method).

Then, parameters a1, a2, b1 and b2 are sequentially estimated using the recursive least-square method constituted by the parameter estimation formulas (17) to (19).

Oxygen adsorption amount calculating section 23 calculates the oxygen adsorption amount in catalyst 12 as follows.

As described above, since $a1 = -(1+e^{-T/k3})$, $a2 = e^{-T/k3}$, $b1 = (1-k1-k2)/k3$ and $b2 = (k1-1)/k3$, then k1, k2 and k3 can be calculated based on the estimated parameters a1, a2, by and b2, in accordance with the following formulas (39) to (42).

$$k1 = k3 \cdot b2 + 1 \quad (39)$$

$$k2 = 1 - k1 - k3 \cdot b1 = -k3 \cdot b2 - k3 \cdot b1 \quad (40)$$

$$k3 = -T/\log(-a1-1) \quad (a1<1) \quad (41)$$

$$k3 = T/\log(a2) \quad (a2>0) \quad (42)$$

Then, calculated $k1(=ap^{1/n}/np)$ and $k2(=ap^{1/n}(1-n)/np^2)$ are substituted for the formula (4), and calculated $k3(=ap^{1/n}/np)$ is substituted for the formula (8), to calculate a change amount of $O_2$ adsorption amount in catalyst 12. Further, the calculated change amount is integrally operated to calculate the $O_2$ adsorption amount in catalyst 12. Note, k3 may be calculated using either of the formulas (41) and (42).

Target air-fuel ratio setting section 24 compares the $O_2$ adsorption amount in catalyst 12 calculated by oxygen adsorption amount calculating section 23 with an optimum oxygen adsorption amount set based on engine operating conditions (for example, an engine load Tp, a rotation speed Ne and the like) and converts a difference therebetween into a target air-fuel ratio, to output the target air-fuel ratio. Here, the optimum air-fuel ratio is an oxygen adsorption amount (range) where the purification efficiency in catalyst 12 becomes a maximum, and the target air-fuel ratio is a target value of exhaust air-fuel ratio detected by A/F sensor 11 on the upstream side of catalyst 12.

Air-fuel ratio feedback (F/B) control section 25 sets a fuel injection quantity based on the target air-fuel ratio (target $\lambda$) set by target air-fuel ratio setting section 24 and the actual air-fuel ratio (actual $\lambda$) detected by A/F sensor 11, to output the fuel injection quantity to fuel injection valve 6.

As described above, it is possible to calculate with high accuracy the oxygen adsorption amount in catalyst 12 corresponding to the variation in characteristic inclusive of the degradation of catalyst 12 itself, by setting the catalyst model (identification model) which represents catalyst 12 by the transfer function, sequentially estimating the parameters of the catalyst model based on the detection values of oxygen concentration sensors 11 and 12 respectively disposed on the upstream and downstream sides of catalyst 12, and using the estimated parameters of catalyst model for the oxygen adsorption amount calculation.

Further, since the oxygen adsorption amount calculated with high accuracy is compared with the optimum oxygen adsorption amount and the difference therebetween is converted into the target air-fuel ratio to be output, it is possible to control the oxygen adsorption amount in catalyst 12 at the optimum oxygen adsorption amount thereby enabling to maintain the high purification efficiency. Moreover, for the identification of catalyst model (estimation of parameters), since the parameter value previously obtained off-line is used as the initial value, it is possible to shorten as much as possible the parameter convergence time at the time of on-line identification, thereby enabling to achieve the early staged stabilization of the entire control.

What is claimed are:

1. An air-fuel ratio control apparatus of an internal combustion engine, comprising:

an exhaust purification catalyst disposed on an exhaust passage of said engine;

a first oxygen concentration detecting section detecting an oxygen concentration in an exhaust gas, on an upstream side of said exhaust purification catalyst;

a second oxygen concentration detecting section detecting the oxygen concentration in the exhaust gas having passed through said exhaust purification catalyst, on a downstream side of said exhaust purification catalyst;

an intake air amount detecting section detecting an engine intake air amount;

a storage section storing a catalyst model that receives an oxygen amount which is not used for the oxidization/reduction in said exhaust purification catalyst and outputs the oxygen concentration in the exhaust gas downstream of said exhaust purification catalyst;

a calculating section calculating the oxygen amount which is not used for the oxidization/reduction in said exhaust purification catalyst, based on the oxygen concentration in the exhaust gas upstream of said exhaust purification catalyst and the engine intake air amount, estimating parameters of said catalyst model, based on the calculated oxygen amount and the oxygen concentration in the exhaust gas downstream of said exhaust purification catalyst, and calculating an oxygen adsorption amount in said exhaust purification catalyst using the estimated parameters of said catalyst model; and a feedback control section feedback controlling an air-fuel ratio upstream of said exhaust purification catalyst based on the calculated oxygen adsorption amount.

2. An air-fuel ratio control apparatus of an internal combustion engine according to claim 1, wherein said catalyst model is represented using a final transfer function of said exhaust purification catalyst, which is calculated, using an adsorption formula, by combining a first transfer function of said exhaust purification catalyst calculated considering only a rapid time constant, and a second transfer function of said exhaust purification catalyst calculated considering only a delay time constant.

3. An air-fuel ratio control apparatus of an internal combustion engine according to claim 2, wherein said adsorption formula is a Freundlich's adsorption formula.

4. An air-fuel ratio control apparatus of an internal combustion engine according to claim 1, wherein said calculating section estimates the parameters of said catalyst model using a recursive least squares method.

5. An air-fuel ratio control apparatus of an internal combustion engine according to claim 1, wherein said calculating section uses a parameter calculation value of said catalyst model previously calculated off-line using a reference exhaust purification catalyst as an initial value of when estimating the parameters of said catalyst model.

6. An air-fuel ratio control apparatus of an internal combustion engine according to claim 1, wherein said first oxygen concentration detecting section is a wide range type oxygen concentration sensor having a characteristic to change linearly an output value thereof relative to a change in the exhaust air-fuel ratio.

7. An air-fuel ratio control apparatus of an internal combustion engine according to claim 1, wherein said second oxygen concentration detecting section is a stoichiometric type oxygen concentration sensor having a characteristic to change abruptly an output value thereof in the vicinity of a stoichiometric air-fuel ratio of the exhaust air-fuel ratio.

8. An air-fuel ratio control apparatus of an internal combustion engine according to claim 1, wherein said feedback control section controls the air-fuel ratio upstream of said exhaust purification catalyst, so that a difference between the oxygen adsorption amount calculated by said calculating section and an optimum oxygen adsorption amount set according to engine operating conditions, becomes small.

9. An air-fuel ratio control apparatus of an internal combustion engine, comprising:

an exhaust purification catalyst disposed on an exhaust passage of said engine;

first oxygen concentration detecting means for detecting an omen concentration in an exhaust gas, on an upstream side of said exhaust purification catalyst;

second oxygen concentration detecting means for detecting the oxygen concentration in the exhaust gas having passed through said exhaust purification catalyst, on a downstream side of said exhaust purification catalyst;

intake air amount detecting means for detecting an engine intake air amount;

catalyst model storage means for storing a catalyst model that receives an oxygen amount which is not used for the oxidization/reduction in said exhaust purification catalyst and outputs the oxygen concentration in the exhaust gas detected by said second oxygen concentration detecting means;

oxygen amount calculating means for calculating the oxygen amount which is not used for the oxidization/reduction in said exhaust purification catalyst, based on the oxygen concentration in the exhaust gas upstream of said exhaust purification catalyst and the engine intake air amount;

catalyst model identifying means for estimating parameters of said catalyst model, based on the oxygen amount calculated by said oxygen amount calculating means and the oxygen concentration in the exhaust gas downstream of said exhaust purification catalyst, to identify said catalyst model;

oxygen adsorption amount calculating means for calculating an, oxygen adsorption amount in said exhaust purification catalyst using the parameters of said catalyst model estimated by said catalyst model identifying means; and feedback control means for feedback controlling an air-fuel ratio upstream of said exhaust purification catalyst based on the oxygen adsorption amount calculated by said oxygen adsorption amount calculating means.

10. An air-fuel ratio control method of an internal combustion engine for feedback controlling an air-fuel ratio upstream of an exhaust purification catalyst disposed on an exhaust passage of said engine, comprising the steps of:

storing a catalyst model that receives an oxygen amount which is not used for the oxidization/reduction in said exhaust purification catalyst and outputs an oxygen concentration in an exhaust gas downstream of said exhaust purification catalyst;

calculating the oxygen amount which is not used for the oxidization/reduction In said exhaust purification catalyst, based on the oxygen concentration in the exhaust gas upstream of said exhaust purification catalyst and an engine intake air amount;

estimating parameters of said catalyst model, based on the calculated oxygen amount and the oxygen concentration in the exhaust gas downstream of said exhaust purification catalyst;

calculating an oxygen adsorption amount in said exhaust purification catalyst using the estimated parameters of said catalyst model; and feedback controlling an air-fuel ratio upstream of said exhaust purification catalyst based on the calculated oxygen adsorption amount.

11. An air-fuel ratio control method of an internal combustion engine according to claim 10, wherein said catalyst model is represented using a final transfer function of said exhaust purification catalyst, which is calculated, using an adsorption formula, by combining a first transfer function calculated considering only a rapid time constant, and a second transfer function of said exhaust purification catalyst calculated considering only a delay time constant.

12. An air-fuel ratio control method of an internal combustion engine according to claim 11, wherein said adsorption formula is a Freundlich's adsorption formula.

13. An air-fuel ratio control method of an internal combustion engine according to claim 10, wherein the parameters of said catalyst model are estimated using a recursive least squares method.

14. An air-fuel ratio control method of an internal combustion engine according to claim 10, wherein a parameter calculation value of said catalyst model previously calculated off-line using a reference exhaust purification catalyst is used as an initial value of when estimating the parameters of said catalyst model.

15. An air-fuel ratio control method of an internal combustion engine according to claim 10, wherein the oxygen concentration in the exhaust gas upstream of said exhaust purification catalyst is detected by a wide range type oxygen concentration sensor having a characteristic to change linearly an output value thereof relative to a change in the exhaust air-fuel ratio.

16. An air-fuel ratio control method of an internal combustion engine according to claim 10, wherein the oxygen concentration of the exhaust gas downstream of said exhaust purification catalyst is detected by a stoichiometric type oxygen concentration sensor having a characteristic to change abruptly an output value thereof in the vicinity of a stoichiometric air-fuel ratio of the exhaust air-fuel ratio.

17. An air-fuel ratio control method of an internal combustion engine according to claim 10, wherein the air-fuel ratio upstream of said exhaust purification catalyst is controlled, so that a difference between the oxygen adsorption amount in said exhaust purification catalyst and an optimum oxygen adsorption amount set according to engine operating conditions, becomes small.

* * * * *